R. M. HUNTER.
VALVE.
APPLICATION FILED OCT. 16, 1914.
1,189,950.
Patented July 4, 1916.
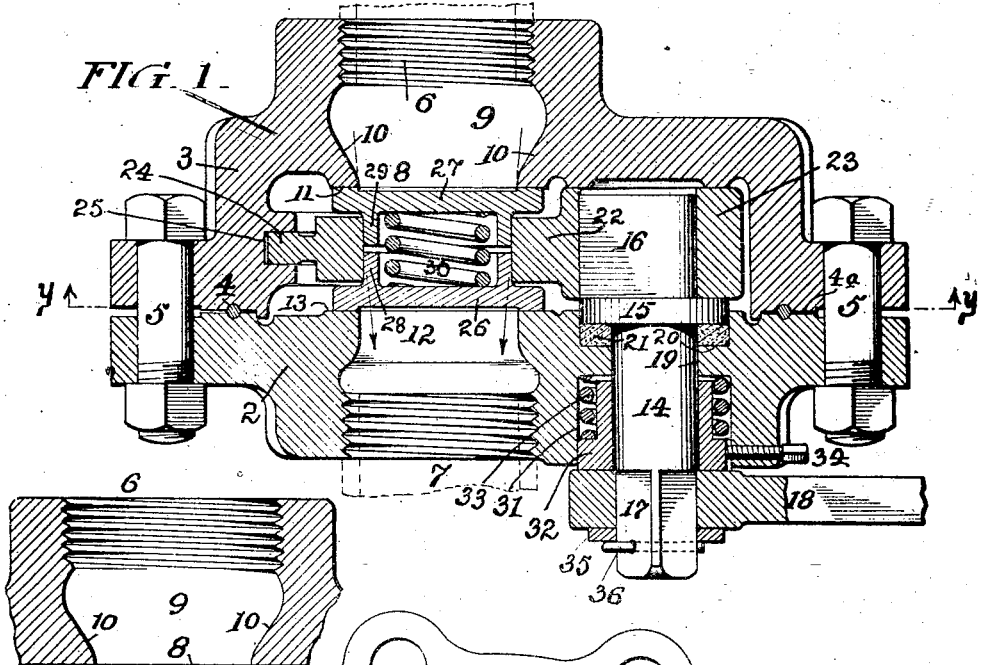
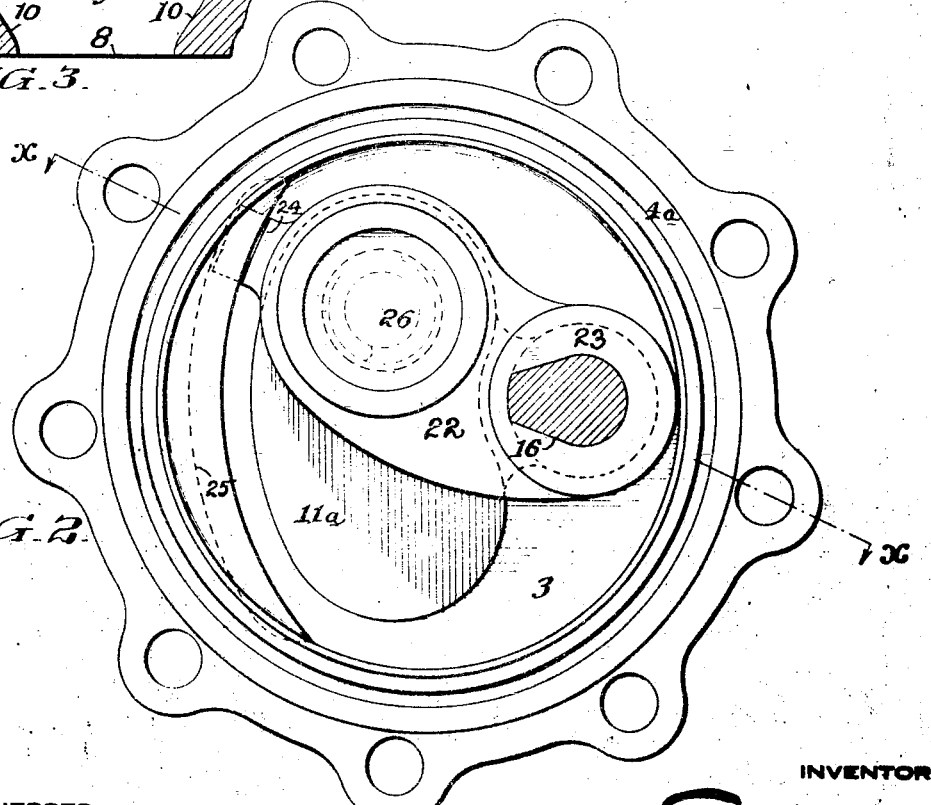
WITNESSES
Daniel Webster Jr.
E. W. Smith
INVENTOR

UNITED STATES PATENT OFFICE.

RUDOLPH M. HUNTER, OF PHILADELPHIA, PENNSYLVANIA, ASSIGNOR TO FORGED STEEL VALVE COMPANY, INC., A CORPORATION OF NEW YORK.

VALVE.

1,189,950.  Specification of Letters Patent.  Patented July 4, 1916.

Application filed October 16, 1914. Serial No. 866,921.

*To all whom it may concern:*

Be it known that I, RUDOLPH M. HUNTER, citizen of the United States, and resident of Philadelphia, county of Philadelphia, and State of Pennsylvania, have invented an Improvement in Valves, of which the following is a specification.

The object of my invention is to provide a construction of through-valve especially designed as a blow-off valve, or where quick action is required.

My invention comprehends features of construction which are fully described hereinafter and more particularly defined in the claims.

Referring to the drawings: Figure 1 is a sectional elevation of my improved valve, taken on line *x*—*x* of Fig. 2; Fig. 2 is an inverted plan view of the upper portion of the valve looking in the direction of the dotted line *y*—*y*, and with the spindle in section; and Fig. 3 is a sectional view of a modified form of the inlet nozzle.

The valve body is formed of the two parts 2 and 3 which have an angular engaging face with an interposed ductile metal packing ring 4 and clamped together by bolts 5. The part 2 of the body is in general contour flat on its upper surface, but in which it has the valve seat 13 slightly higher than the annular surface 4ª containing the packing ring 4, this higher level of the seat being to enable it to be surfaced in case of wear, either by planing or by turning, as may be desired. The valve seat 13 for the valve piece 26 has an outlet port 12. The port 12 has an outlet 7 which may be screw-threaded or otherwise formed for suitable connection with piping. The other part 3 of the valve casing is made with a recessed interior to provide space for the valve mechanism, and it is provided with a port 8 surrounded with a valve seat 11 which has a laterally extended portion 11ª as a guide for the valve piece 27. The valve seat 13 of the part 2 is constructed with a lateral extension corresponding to 11ª of the valve seat 11, so that the opposing valve seats are uniform and provide surfaces between which the valve pieces 26 and 27 travel. The port 8, constituting the inlet port, has outwardly flaring walls 10 providing an expansion chamber 9 which terminates at its outer part in an inlet 6 which may be screw-threaded or otherwise formed for receiving the steam or other fluid to be controlled. The ports 8 and 12 are of the same diameter, but the flaring walls 10 of the port 8 act to cause the steam or fluid to converge when passing from the port 8 to the port 12 when the valve is open, and thereby avoid causing scale or solid matter from cutting away the valve seat 13. To form the conical or inclined walls 10, the chamber 9 is provided, which is an enlargement over the diameter of the supply pipe which would be screwed into the inlet 6. In other words, the inlet pipe and the outlet pipe, as well as the ports 8 and 12, may be all of the same diameter, but by allowing the fluid to converge in passing through the port 8, it will be delivered into the discharge pipe through the port 12 without being caused to directly impinge upon the edges of the port 12 or the valve seat surface 13. This is especially important in high pressure work. It is of course manifest that the inlet pipe may be larger in diameter than the area of the port 8, and this is indicated by the construction shown in Fig. 3. It is preferable, however, that the sizes of the pipes connecting with the inlet and the outlet portions of the valve should be the same, but this may be varied to suit the wishes of the designer.

22 is a swinging arm, which is rocked by a spindle 14 journaled in the part 2 of the casing. This arm 22 is bored out to receive the cylindrical hub portions 28 and 29 of the respective valve pieces 26 and 27, so that they are carried with the swinging arm, but at the same time have capacity for adjustment relative to their respective seats. These hub portions 28 and 29 are recessed to provide a compartment in which is located a spring 30, the same acting to force the two valve pieces 26 and 27 against their respective seats, and without applying any pressure to the arm 22 itself.

The pivotal part of the arm 23 is provided with a socket shaped to receive the head 16 of the spindle, which is so shaped as to cause the arm to be positively oscillated by any rotation of the spindle itself. This spindle is provided with a collar 15 immediately to one side of the head 16. The spindle 14 fits through a bearing aperture 19 in the part 2 of the casing, and is surrounded by a copper packing ring 21 which is arranged in an annular recess 20 in the casing and immediately under the collar 15 of the spindle, the said collar preferably extending somewhat into the recess, as is clearly shown. In this manner, the collar makes a rotary packed joint upon the packing, and the normal tightness of the joint is increased by the pressure on the inside of the valve forcing the collar on the packing. The hub part 23 of the arm 22 is snugly fitted between the collar 15 and the inner face of the wall of the part 3 of the casing, so that there is freedom of rotation but practically no end play, and this construction at the same time permits the movement of the spindle longitudinally to insure the collar 15 pressing upon the packing ring 21. The opposite end of the swinging arm 22 is provided with a lug 24 which fits in a curved guideway or groove 25 through which it freely travels when the spindle is rocked. By means of this guideway and the lug 24 projecting from the arm 22, it will be seen that the said arm is supported at both ends and therefore does not interfere with the free adjustment of the valve pieces 26 and 27 in relation to their seats. It merely acts as a means of holding the said valve pieces in alinement and closing the gap between them, so that the spring 30 is shielded within a chamber which does not become clogged with dirt. Moreover, in this construction, the spring is fully shielded from direct action of the steam or hot water, and will therefore maintain its elasticity to a greater extent than where it is exposed to the hot passing fluid.

The spindle 14 is surrounded by a bushing 32 which snugly fits an annular recess 31 in the casing part 2, said bushing acting as a further support and guide to the spindle. The bushing 32 is shouldered as shown, and surrounding it is a spring 33 which forces the bushing outward against the hub of the operating lever 18, which latter is fitted over the square end of the spindle and held in place by a washer 35 and cotter pin 36. The action of this spring 33, acting through the bushing and the operating lever 18, tends to hold the collar 15 tightly upon the packing 21 to assist in making a steam and water tight joint, and at the same time preventing any rattling due to wear. The rotation of the bushing 32 may be prevented by the employment of a set screw 34 which may enter a slot in the edge of the bushing, but the pressure should not be sufficient to prevent the longitudinal adjustment of the bushing under the action of the spring.

From the foregoing construction, it will be evident that a compact and practical construction for a quick-acting valve is provided, and that the heavy operating or swinging arm 22 is supported independently of the valve seats, the latter being governed wholly by the valve pieces 26 and 27 which may be formed of bronze or brass, and these being light and freely adjustable, will insure at all times a tighter closure with less wear upon the seats than where the arm 22 is employed as forming a bearing with the inlet seat, as has heretofore been the customary practice. Furthermore, this construction of valve is reversible, as there is provided a clearly defined valve piece for both ports, and in which both operate under exactly the same conditions. It will also be understood that as the heavy arm 22 is guided at both ends, it maintains an accurate alinement with the operating stem, and removes all objectionable bending strain upon the said spindle, and consequently removes much of the wear of the spindle in its bearing, which has heretofore been the case where such arms have been supported wholly by the spindle.

While I have shown the construction of the valve in the form which I deem most preferable in practice, I do not restrict myself to the details thereof, as these may be modified without departing from the spirit of the invention.

Having now described my invention, what I claim as new and desire to secure by Letters Patent, is:—

1. In a valve, the combination of the casing formed of a plurality of parts bolted together and providing an internal chamber having inlet and outlet ports opening respectively through the opposite faces and terminating in opposed valve seats, a spindle journaled in one of the parts of the casing to one side of the port there through, a swinging arm carried on the inner end of the spindle so as to be moved thereby and having an aperture through the free end in alinement with the ports, two valve pieces of the same cross-section respectively working in contact with the valve seats and having recessed hubs of the same diameter fitting the aperture in the swinging arm and each of a depth approximately equal to one-half the thickness of the swinging arm so as to be wholly independent of each other, and a spring inclosed between the valve pieces and inclosed thereby for pressing the valve pieces upon their respective seats.

2. In a valve, the combination of the casing formed of a plurality of parts bolted together and providing an internal chamber having inlet and outlet ports opening respectively through the opposite faces and terminating in opposed valve seats and also having a guide in its side wall and extending in a plane parallel to the plane of the valve seats, a spindle journaled in one of the parts of the casing to one side of the port there through, a swinging arm carried on the inner end of the spindle so as to be moved thereby and having an aperture through the free end in alinement with the ports the said swinging arm having its free end provided with a projection guided by the guide on the side of the internal chamber for supporting said arm against movement toward either valve seat, two valve pieces respectively working in contact with the valve seats and having hubs fitting the aperture in the swinging arm, and a spring inclosed between the valve pieces and inclosed thereby for pressing the valve pieces upon their respective seats.

3. In a valve, the combination of the casing formed of a plurality of parts bolted together and providing an internal chamber having inlet and outlet ports opening respectively through the opposite faces and terminating in opposed valve seats, a spindle journaled in one of the parts of the casing to one side of the port there through having an annular collar adapted to seat upon the inner part of the casing to form a tight joint, a bushing surrounding the spindle and guided in an aperture in the open face of the casing, an arm secured to the end of the spindle for operating it and against which the bushing exerts a pressure, a spring surrounding the bushing for forcing it outward against the operating arm for causing the collar of the spindle to make a tight joint in the casing, a swinging arm carried on the inner end of the spindle so as to be moved thereby and having an aperture through the free end in alinement with the ports, two valve pieces respectively working in contact with the valve seats and having hubs fitting the aperture in the swinging arm, and a spring inclosed between the valve pieces and inclosed thereby for pressing the valve pieces upon their respective seats.

4. In a valve, the combination of a body having an internal chamber formed with inlet and outlet ports, means to control the ports, a spindle for actuating said means said spindle having an annular collar for making a tight joint on the inside of the casing, an arm secured to the outer end of the spindle for rotating it, a bushing surrounding the spindle and guided in an aperture in the outer surface of the casing, and a spring arranged in the said aperture and extending around the spindle for forcing the bushing outwardly to impart an outward spring action to the spindle for holding its collar tightly upon its seat.

5. In a valve, the combination of a body having an internal chamber formed with inlet and outlet ports, means to control the ports, a spindle for actuating said means said spindle having an annular collar for making a tight joint on the inside of the casing, an arm secured to the outer end of the spindle for rotating it, a bushing surrounding the spindle and guided in an aperture in the outer surface of the casing, means to hold the bushing against rotation while permitting it to move longitudinally in the casing, and a spring arranged in the said aperture and extending around the spindle for forcing the bushing outwardly to impart an outward spring action to the spindle for holding its collar tightly upon its seat.

6. In a valve, the combination of a body composed of a plurality of parts secured together to form an internal chamber provided with an inlet and an outlet opening in alinement through the said chamber, the inlet having an expansion chamber formed as a part of the body and of greater diameter than the inlet opening for the fluid and shaped to provide inclined walls converging in the direction of the axis of the inlet port where it opens into the internal chamber, whereby the flow of the fluid is given a conical direction so that it shall pass through the outlet port without injury to its walls, and means within the internal chamber for controlling the fluid passing through the ports.

7. In a valve, the combination of a casing formed of a plurality of parts bolted together and providing an internal chamber having inlet and outlet ports respectively through opposite faces and terminating in opposed valve seats and also having a guide in the side wall and extending in a plane parallel to the plane of the valve seats, a spindle journaled in one of the parts of the casing to the side of the port therein farthest from the side guide, a swinging arm carried by the spindle so as to be moved thereby said swinging arm having its free end guided upon the guide so as to be supported against movement toward either valve seat, and valve means movable with the swinging arm for controlling the flow through the ports.

In testimony of which invention, I hereunto set my hand.

R. M. HUNTER.

Witnesses:
 FLORENCE DEACON,
 E. W. SMITH.